United States Patent [19]

Hara et al.

[11] Patent Number: 4,504,527

[45] Date of Patent: Mar. 12, 1985

[54] METHOD FOR THE INSULATION OF HEATED METALIC MATERIALS

[75] Inventors: Sadao Hara; Hiroaki Moritani; Hisashi Kaga, all of Hokkaido; Toshihiro Minaki, Kanagawa; Kenichi Shibata, Kanagawa; Junichi Ogawa, Kanagawa; Kaoru Umino, Tokyo, all of Japan

[73] Assignees: The Japan Steel Works, Ltd.; Nichias Corporation, both of Tokyo, Japan

[21] Appl. No.: 349,118

[22] Filed: Feb. 16, 1982

[30] Foreign Application Priority Data

Feb. 23, 1981 [JP] Japan ................................ 56-24355

[51] Int. Cl.$^3$ ................................ B05D 3/02
[52] U.S. Cl. ................................ 427/318; 106/38.27; 427/469; 427/471; 427/472; 427/920
[58] Field of Search ................ 427/318; 428/920, 469, 428/472, 471; 106/38.27

[56] References Cited

U.S. PATENT DOCUMENTS

| 3,783,013 | 1/1974 | Seeman | 427/318 |
| 3,930,872 | 1/1976 | Toemiskoetter et al. | 106/38.3 |
| 3,955,987 | 5/1976 | Schaar et al. | 428/920 |
| 3,977,885 | 8/1976 | Bombola | 427/318 |
| 3,991,254 | 11/1976 | Takeuchi | 428/920 |
| 3,997,700 | 12/1976 | Jacquenin et al. | 428/920 |
| 4,298,051 | 11/1981 | Page | 106/38.27 |

Primary Examiner—Norman Morgenstern
Assistant Examiner—Janyce A. Bell
Attorney, Agent, or Firm—Sughrue, Mion, Zinn, Macpeak, and Seas

[57] ABSTRACT

A method for the insulation of a hot metallic material which is heated for hot working is described, which comprises applying a mixture of acidic aluminum phosphate, e.g., aluminum hydrogenorthophosphate, a multivalent metal oxide, hydroxide, silicate or carbonate powder, and water onto the surface of the hot metallic material and allowing the mixture to be heated by the heat of the hot metallic material to convert it to a porous hardened material. The porous hardened material acts as an insulating coating layer for the hot metallic material, permitting hot working in an insulated state for a long period of time.

6 Claims, No Drawings

METHOD FOR THE INSULATION OF HEATED METALIC MATERIALS

FIELD OF THE INVENTION

The present invention relates to a method for the insulation of metallic materials which are heated for hot working.

BACKGROUND OF THE INVENTION

In hot working of a metallic material, e.g., steel, spontaneous emission of heat from the hot metallic material occurs even during the working, resulting in cooling-down of the metallic material. This increases the deformation stress in the metallic material and make the working gradually more difficult. At this point, therefore, it is necessary to reheat the material.

Since the loss of energy during repeated heating and working is large, it is desirable from a standpoint of envergy-saving to prevent the emission of heat during the working so as to increase the quantity of work that can be done when heating only once.

In the case of material which is transformed below a temperature at which a hot working is carried out, such as austenite, as the number of repeated heatings is increased, grain growth will occur, leading to a reduction in the quality of the metal. It is, therefore, also necessary from a standpoint of insurance of quality to minimize the number of heating repetitions by preventing the emission of heat during hot working.

Moreover, when the cooling rate is high, the reduction in temperature at the edges of the metallic material proceeds more rapidly than at other areas. This leads to a rapid reduction in ductility and, therefore, to ready formation of defects such as cracks and flaws during the working.

Various attempts have heretofore been made to control the emission of heat during hot working, including a method in which an insulating cover is provided as a part of the equipment for use in hot working and a method in which an insulating cover is provided directly on a hot metallic material to be worked (this method is described in Japanese patent application Laid-Open No. 94745/1980). The insulating cover used in the former method, however, has only a poor insulating effect. The latter method suffers from the disadvantages that it is necessary to prepare a number of different insulating covers depending on the shape of the metallic material to be worked, and that these insulating covers interfere with the hot working of the material.

SUMMARY OF THE INVENTION

One object of this invention is to provide a method for effective insulation of a hot metallic material, which is free from the above described prior art defects.

The present invention, therefore, provides a method for the insulation of a hot metallic material which is heated for hot working, which method comprises applying a mixture of 10 to 75% by weight (hereinafter all percents (%) are by weight) of acidic aluminum phosphate, 5 to 70% of a powder of multivalent metal oxide, hydroxide, silicate or carbonate, and 20 to 80% of water onto the surface of the hot metallic material and allowing the mixture to be heated by the heat of the hot metallic material to convert it into a porous hardened material whereby the surface of the hot metallic material is covered with an insulating coating.

DETAILED DESCRIPTION OF THE INVENTION

The method for insulation in accordance with this invention completely differs from the conventional methods as described hereinabove in that an insulating coating is provided directly onto the surface of a hot metallic material just before the working thereof. Furthermore, it is unique in the manner of formation of the insulating coating.

Hereinafter the method of the invention will be explained in detail.

The term "acidic aluminum phosphate" is used herein to refer to water-soluble and acidic salts of aluminum and phosphoric acids having an oxidation number of 5, e.g., orthophosphoric acid, metaphosphoric acid and polyphosphoric acid, i.e., aluminum salts still bearing a hydrogen of such phosphoric acids which can be replaced.

Acidic aluminum salts of orthophosphoric acid are easily available and furthermore, produce good results. In particular, those acidic salts having a molar ratio of $Al_2O_3/P_2O_5$ of 0.3/1 to 0.5/1 (hereinafter all the ratios of $Al_2O_3/P_2O_5$ are by mole) are preferred.

When the molar ratio of $Al_2O_3/P_2O_5$ is below 0.3/1, the reaction between the acidic aluminum phosphate and the multivalent metal compound powder on heated metallic materials is too rapid and therefore, it is liable to proceed unevenly. Thus an insulating coating which is uniformly foamed and bonded firmly to the metallic material cannot be obtained. Alternatively, when the molar ratio of $Al_2O_3/P_2O_5$ is above 0.5/1, the reactivity of the acidic aluminum phosphate with the multivalent metal compound powder is poor and therefore, an insulating coating having insufficient insulation properties and adhesion strength is obtained.

Examples of multivalent metal oxides, hydroxides, silicates and carbonates which are used in combination with the acidic aluminum phosphate include the oxides, hydroxides, silicates and carbonates of zinc, magnesium, aluminum, beryllium, titanium, barium, calcium, tin, copper, cadmium, nickel, lead, iron and zirconium. Thus, powders composed of one or more of such multivalent metal oxides, hydroxides, silicates and carbonates, or ore powders composed mainly (50% or more) of one or more of such multivalent metal oxides, hydroxides, silicates and carbonates, etc. can be used in the invention. Particularly preferred are powders of aluminum oxide, aluminum hydroxide, calcium silicate, zinc oxide, titanium oxide, silica, mulite, kaolin, bentonite, wollastonite, talc, limestone, and dolomite. Preferably the grain size of the powder is from about 0.1 $\mu$ to about 10 $\mu$.

To the acid aluminum phosphate and multivalent metal compound powder can be added non-reactive auxiliary materials. Examples of such non-reactive auxiliary materials include inorganic materials capable of expanding upon heating, e.g., perlite, vermiculite, expandable graphite, fibrous reinforcing materials, e.g., potassium titanate whiskers and fine ceramic fibers, and dyes for coloration. In addition, sodium phosphate, boric acid, citric acid and oxalic acid may be added thereto in a small amount, particularly 10% or less, because they have the effect of stabilizing foaming.

A mixture of 10 to 75% of the acidic aluminum phosphate, 5 to 70% of the multivalent metal compound powder, and 20 to 80% of water (aluminum phosphate is dissolved in water) is applied in a uniform thickness of about 1 to 3 mm by techniques such as spraying, dipping and roll coating on the surface of metallic materials which have been heated for hot working. When the mixture comes into contact with hot metallic materials and is heated by them, the reaction starts immediately. At this point it is believed that a part of the water participates in the reaction. As the reaction proceeds, the water is evaporated, and when auxiliary materials capable of expanding on heating, e.g., perlite, are compounded, expansion occurs simultaneously. This results in the formation of a high viscosity foamed material and finally a porous and hardened coating layer composed mainly of phosphate on the surface of the hot metallic material.

It is only within the above described mixing ratio of the acidic aluminum phosphate, multivalent metal compound, and water that the formation of a hard coating layer as described above which is sufficiently porous, is well bonded to hot metallic materials, and is strong proceeds smoothly. However, since the optimum mixing ratio varies depending on the type of materials used, it is desirably determined experimentally.

The porous coating layer once formed on the surface of hot metallic material is not subject to shrinkage, peeling-down caused by deterioration in physical properties, etc., over time even though there is a slight change in the temperature thereof. Thus the porous coating layer exhibits excellent insulation properties throughout the hot working of metallic materials.

The porous coating layer formed by the method of this invention prevents substantial reduction in the temperature of a steel material due to heat emission not only before hot working but also during hot working since it continues to retain the insulation effectiveness although it is compressed into a flat form by hot working.

In addition to the advantages described above, the method of the invention offers the following advantages:

(1) It is not limited by the size and form of metallic material.

(2) Since a coating layer is formed which is in close contact with metallic material, the temperature insulation effect is very great.

(3) The coating layer does not interefere with hot working, and it is not necessary to alter existing equipment.

In hot working of metallic materials, therefore, the method of this invention effectively secures a saving of energy, a reduction in the number of steps, a shortening in the time required for the working, and an increase in the quality of hot worked products.

The following Examples are given to illustrate the invention in greater detail.

EXAMPLE 1

A carbon steel member having a diameter of 600 mm and a length of 3,000 mm was heated to 1,250° C. in a furnace and removed. Immediately a mixture of 35% of aluminum hydrogenorthophosphate ($Al_2O_3/P_2O_5=0.33$), 5% of aluminum oxide powder (average grain size: 2.5 $\mu$), 8% of superfine silica powder (average grain size: 0.2 $\mu$), 2% of unburned vermiculite (average grain size: 0.3 mm), 5% of potassium titanate fibers, 0.5% of titanium oxide, and 44.5% of water was sprayed onto the hot carbon steel member in an amount of about 3 kg/m$^2$ by the used of a spray gun. The mixture thus sprayed on the hot carbon steel member expanded and in one minute hardened to form a porous coating layer having a thickness of about 10 mm.

The carbon steel member with the porous coating layer provided thereon was allowed to cool for one hour. At the end of the time, the temperature of the carbon steel member at a point 20 mm below the surface thereof was measured and found to be 980° C.

For comparison, the same carbon steel member heated to 1,250° C. as above was allowed to cool under the same conditions as above without application of the insulation treatment. The temperature of the carbon steel member at a point 20 cm below the surface was 790° C.

The same carbonn steel member as used above was heated to 1,250° C. and then the same insulation treatment as above was applied thereto. Immediately the treated carbon steel member was subjected to 50 mm forge extension; that is, the diameter of the carbon steel member was varied from 600 mm to 550 mm. The coating layer was not peeled apart although it was converted into a flat form, and therefore the hot working could be continued in an insulated stage.

EXAMPLE 2

A SUS 304 stainless steel member (450 mm $\times$ 450 mm $\times$ 5,000 mm) was heated to 1,100° C. in a furnace and removed. Immediately a mixture of 35% of aluminum hydrogenorthophosphate ($Al_2O_3/P_2O_5=0.45$), 6% of aluminum hydroxide powder (average grain size: 1.4 $\mu$), 30% of superfine mulite powder (average grain size: 0.3 $\mu$), 4% of graphite capable of expanding on heating (average grain size: 0.2 mm), 1% of oxalic acid, 1% of zinc white, and 23% of water was coated on the hot stainless steel member in an amount of about 2.5 kg/m$^2$ by the use of a roll coater.

The mixture thus coated on the hot stainless steel member expanded and in one minute, hardened to form a porous coating layer having a thickness of about 12 mm. The hot stainless steel member with the porous coating layer provided therein was allowed to cool for one hour. At the end of the time, the temperature of the stainless steel member at a point 20 mm below the surface was measured and found to be 925° C.

For comparison, the same stainless steel member heated to 1,100° C. as above was allowed to cool under the same conditions as above without the application of the insulation treatment. The temperature of the stainless steel member at a point 20 mm below the surface was 720° C.

The same stainless steel member as used above was heated to 1,100° C. and then the same insulation treatment as above was applied thereto. Immediately the thus treated stainless steel member was subjected to 50 mm forge extension; that is, the thickness of the stainless steel member was varied from 450 mm to 400 mm. The coating layer was not peeled apart although it was converted into a flat form, and therefore the hot working could be continued in an insulated state.

While the invention has been described in detail and with reference to specific embodiment thereof, it will be apparent to one skilled in the art that various changes and modifications can be made therein without departing from the spirit and scope thereof.

What is claimed is:

1. A method for insulating heated metallic material comprising applying a mixture consisting essentially of 10 to 75% by weight of acidic aluminum phosphate, 5 to 70% by weight of a multivalent metal oxide, hydroxide, silicate or carbonate powder, and 20 to 80% by weight of water onto the surface of the heated metallic material and allowing the mixture to be heated by the heat of the heated metallic material to convert said mixture into a porous hardened material whereby an insulating coating layer is formed on the surface of the heated metallic material, wherein said powder is selected from at least one member of the group consisting of aluminum oxide, aluminum hydroxide, calcium silicate, zinc oxide, titanium oxide, silica, mulite, kaolin, bentonite, talc, limestone, and dolomite.

2. The method of claim 1, wherein the acidic aluminum phosphate is aluminum hydrogenorthophosphate having a molar ratio of $Al_2O_3/P_2O_5$ of 0.3/1 to 0.5/1.

3. The method of claim 1 or 2, wherein said mixture further comprises a non-reactive inorganic material capable of expansion upon heating selected from the group consisting of perlite, vermiculite, expandable graphite, fibrous reinforcing materials, and combinations thereof.

4. The method of claim 1 or 2, wherein said mixture further comprises a foaming stabilization agent selected from the group consisting of sodium phosphate, boric acid, citric acid, oxalic acid and combinations thereof.

5. The method of claim 3, wherein said mixture further comprises a foaming stabilization agent selected from the group consisting of sodium phosphate, boric acid, citric acid, oxalic acid and combinations thereof.

6. The method of claim 1, wherein the grain size of said powder is from about 0.1 micron to about 10 microns.

* * * * *